(12) United States Patent
Arioka et al.

(10) Patent No.: US 6,392,157 B2
(45) Date of Patent: May 21, 2002

(54) DEVICE FOR BUS COUPLING BETWEEN ENCLOSED SWITCHBOARDS WITH INSULATING GAS SEALED THEREIN

(75) Inventors: Masahiro Arioka; Hiroshi Isoya, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/765,410

(22) Filed: Jan. 22, 2001

(30) Foreign Application Priority Data

Jan. 20, 2000 (JP) .................................. 2000-011742

(51) Int. Cl.[7] .............................................. H01B 17/26
(52) U.S. Cl. ..................... 174/142; 439/921; 174/70 B; 174/71 B; 174/72 B
(58) Field of Search ............................. 174/152 R, 145, 174/168, 70 B, 71 B, 72 B; 439/884, 921, 212, 210

(56) References Cited

U.S. PATENT DOCUMENTS 4,032,820 A * 6/1977 Oishi et al. ................... 218/75
4,865,559 A * 9/1989 Clabburn ..................... 439/281
6,002,085 A * 12/1999 Utsumi et al. ............ 174/137 A
6,042,407 A * 3/2000 Scull et al. ................. 439/181

FOREIGN PATENT DOCUMENTS

| DE | 195 02 048 | * | 7/1996 |
| EP | 0 624 924 | * | 5/1994 |
| JP | 60-160309 | | 8/1985 |
| JP | 7-230731 | | 8/1995 |

* cited by examiner

Primary Examiner—Dean A. Reichard
Assistant Examiner—Jinhee Lee
(74) Attorney, Agent, or Firm—Sughrue Mion, PLLC

(57) ABSTRACT

An inexpensive device for bus coupling between enclosed switchboards with an insulating gas sealed therein has a simple structure and requires a shorter time for installation. The bore shape of a connection port for a coupling bus in a T-shaped bushing is a conical shape having a diameter that increases outwardly. The coupling bus is covered with an insulating rubber member, and a conductive layer is provided on an outer peripheral surface of the insulating rubber member, and grounded. Both ends of the coupling bus that are inserted into the connection ports are formed to have shapes that fit to the conical connection ports.

3 Claims, 4 Drawing Sheets

DEVICE FOR BUS COUPLING BETWEEN ENCLOSED SWITCHBOARDS WITH INSULATING GAS SEALED THEREIN

BACKGROUND OF THE INVENTION

1. Field of the Invention

The present invention relates to a device for bus coupling between enclosed switchboards with an insulating gas sealed therein, such as cubicle type gas-insulated switchgear.

2. Description of the Related Art

FIG. 3 shows a schematic construction of a known conventional cubicle type gas-insulated switchgear 100 employing a square container. The switchgear 100 includes a plurality of cubicles 101, 102, 103, and 104. The cubicles 101, 102, 103, and 104 accommodate devices for each unit circuit, such as a circuit breaker, a disconnector, and a transformer for measuring instruments. Power is supplied to the switchgear 100 through a power receiving cable 105. The cubicles 101, 102, 103, and 104 are electrically connected via T-shaped bushings 31 by insulated coupling buses 35 for establishing communication between switchboards.

FIG. 4 shows an example of a specific structure of the conventional known T-shaped bushing 31 used in the gas-insulated switchgear 100. The T-shaped bushing 31 is disclosed, for example, in FIG. 8 of Japanese Laid-open Patent Application No. 60-160309.

As shown in FIG. 4, the conventional T-shaped bushing 31 includes a T-shaped bushing mold 41 with a substantially T-shaped current-carrying conductor 32 integrally formed therein. The T-shaped bushing mold 41 is normally molded using an epoxy resin. The current-carrying conductor 32 is formed to have a substantially T shape by a cylindrical shielding electrode 32a and a conductor drawing-out rod 32b that juts out perpendicularly in a radial direction from a central outer periphery of the shielding electrode 32a. A contact 39 is disposed on an inner periphery of the shielding electrode 32a. The contact 39 is formed such as by inserting an elastic conductive plate, which has many punched holes, along an inner periphery of a concave groove 42 provided in an inner periphery of the shielding electrode 32a.

To connect the cubicles 101, 102, 103, and 104 by the T-shaped bushings 31 constructed as set forth above, the coupling buses 35 formed of a bridging polyethylene insulated cable that has been cut to a predetermined length are used.

First, both ends of the coupling bus 35 are stripped to expose a conductor 43 and an insulator 44 (only one end is shown in FIG. 4). Then, a stress cone 46 for relieving the electric field of a shielding layer 45, a pressing member 47 such as a spring that presses the stress cone 46 toward a connection port 40 of the coupling bus 35, a protective tube 48 for protecting the end of the coupling bus 35, etc. are attached to an outer periphery of the exposed insulator 44.

Subsequently, a conductive plug 49 which has an outside diameter substantially equal to or greater than an outside diameter D of the coupling bus before the coupling bus 35 is stripped and which is to be closely fitted to the contact 39 is attached to the end of the conductor 43. The plug 49 is disposed such that it is closely fitted to the contact 39, and the required components, including the stress cone 46, that have been attached in advance, are disposed at predetermined positions, and these components are then assembled by common means. In FIG. 4, reference numeral 104 denotes a cubicle, which is identical to the one shown in FIG. 3, reference numeral 50 denotes a blank cap, reference numeral 51 denotes a seal, reference numeral 52 denotes an external semiconductive layer, and reference numeral 53 denotes a shield.

However, since the conventional device for bus coupling between the enclosed switchboards with an insulating gas sealed therein uses the bridging polyethylene insulated cable cut to a predetermined length as the coupling bus 35, the stripping process is cumbersome and it is also difficult to improve machining accuracy. Furthermore, as the ends of the coupling bus 35 are stripped, the seal 51, the protective tube 48, the stress cone 46, etc. are required. This results in a complicated structure, a cumbersome assembly process, a prolonged assembly time, and an increased cost.

SUMMARY OF THE INVENTION

Accordingly, the present invention has been made with a view toward solving the problems with the prior art, and it is an object of the invention to provide an inexpensive device for bus coupling between enclosed switchboards with an insulating gas sealed therein that has a simpler structure and permits a shortened time for assembly.

To this end, according to one aspect of the present invention, there is provided a device for bus coupling between enclosed switchboards with an insulating gas sealed therein, comprising: a coupling bus for establishing communication between switchboards that have an insulating gas sealed therein and which accommodate electric units; a T-shaped bushing that has a current-carrying conductor integrally molded therein, a connection port for the coupling bus, and a contact for making connection between the coupling bus and the current-carrying conductor; and a fixture for securing an end of the coupling bus that has been inserted in the connection port of the T-shaped bushing, wherein a bore shape of the connection port for the coupling bus in the T-shaped bushing is a conical shape in which the diameter thereof increases outwardly, the coupling bus has a central conductor composed of a one-wire conductor, an insulating rubber member covering an outer peripheral surface of the central conductor, and a conductive layer formed on the outer peripheral surface of the insulating rubber member, in which both end portions of the insulating rubber member are formed into conical portions that fit to the connection port, a portion between both end portions is formed into a cylindrical portion having a uniform diameter, and a boundary portion between the cylindrical portion and the conical portions is formed into a stepped portion so that the outside diameter of the cylindrical portion is smaller than the outside diameters of the conical portions, the fixture secures the coupling bus by pressing the stepped portion into the connection port, and the conductive layer is provided only on an outer peripheral surface of the cylindrical portion, and further, is grounded.

The coupling bus according to the present invention may have a conductive layer between an inner surface of the insulating rubber member and the outer peripheral surface of the central conductor.

The device for bus coupling between enclosed switchboards with an insulating gas sealed therein according to the present invention may be provided with an air unit coupling bushing at one of the connection ports of the T-shaped bushing. In this case, the air unit coupling bushing is equipped with a central conductor and an insulating rubber member covering the central conductor. One end of the insulating rubber member is formed into a conical portion that fits to the connection port, and an outer peripheral surface on an outer side of the connection port in the insulating rubber member is provided with ribs that have an outside diameter larger than the outside diameter of the conical portion.

DESCRIPTION OF THE PREFERRED EMBODIMENTS

Figure 1:
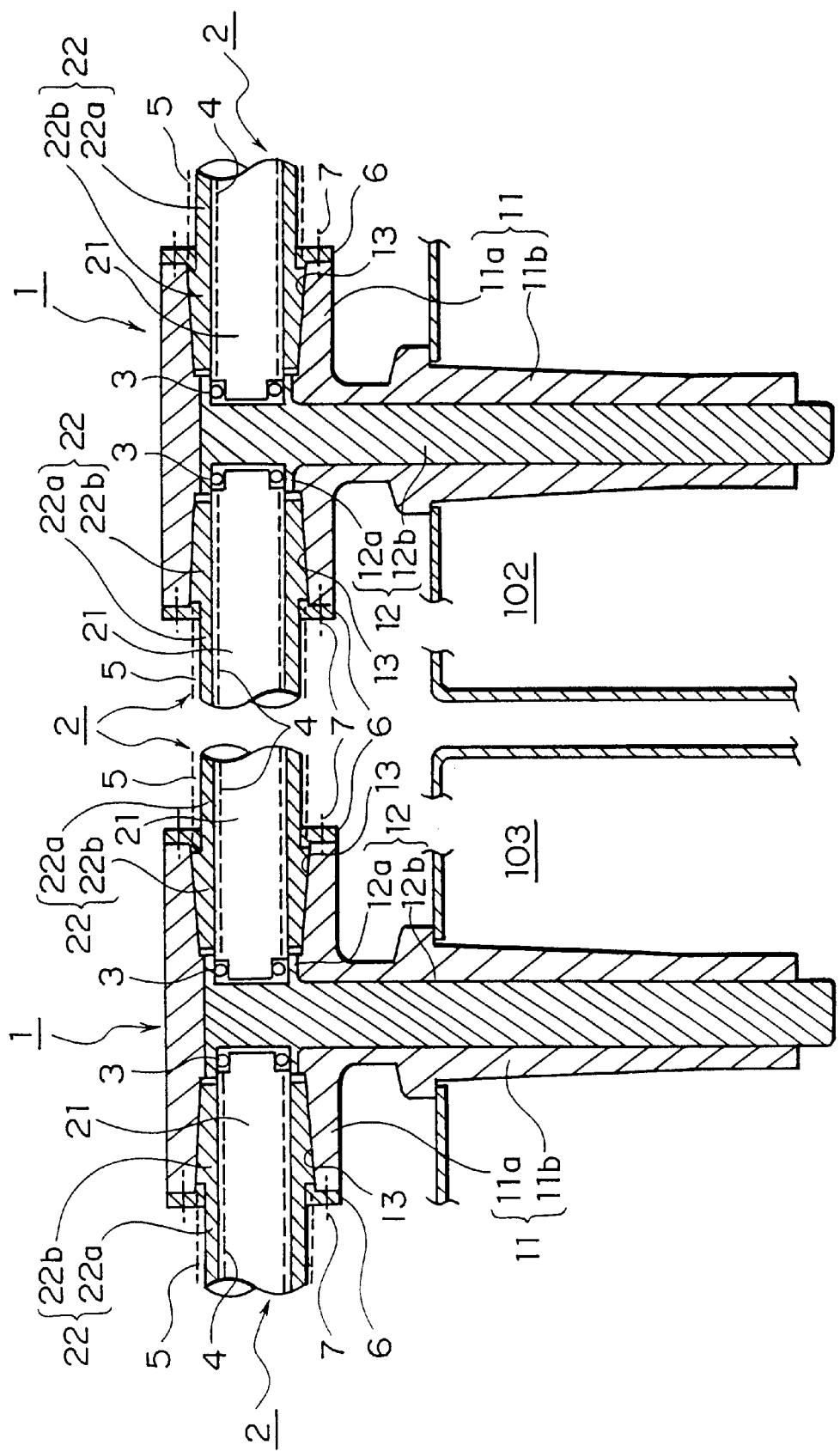
FIG. 1 is a block diagram showing a first embodiment in accordance with the present invention.

The following will describe embodiments of the present invention. Components similar to those of the conventional device will be denoted by like reference numerals, and the descriptions thereof will be abbreviated.

First Embodiment

Figure 3:
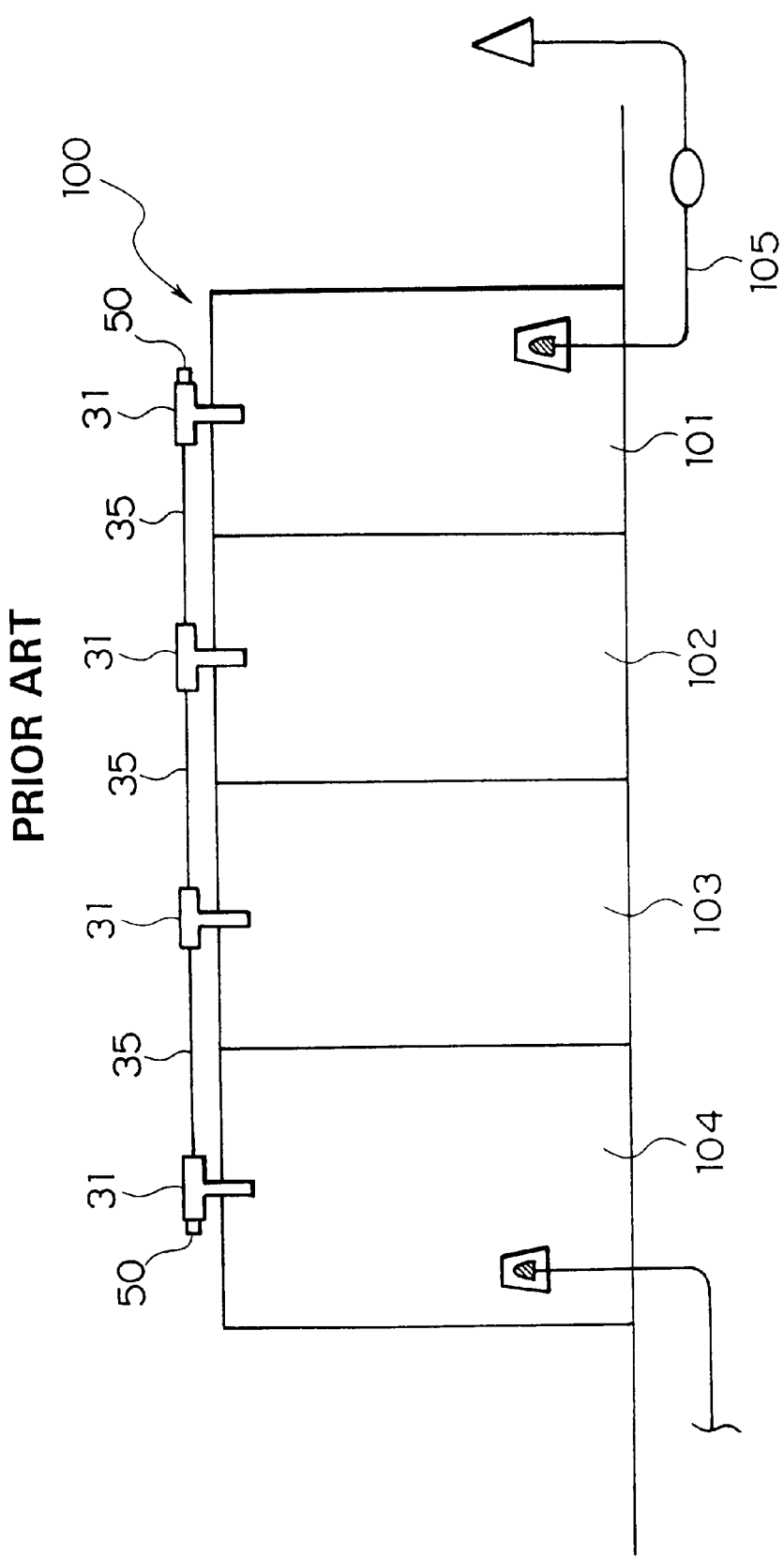
FIG. 3 is a schematic block diagram showing a cubicle type gas-insulated switchgear used as a conventional enclosed switchboard with an insulating gas sealed therein.
Figure 4:
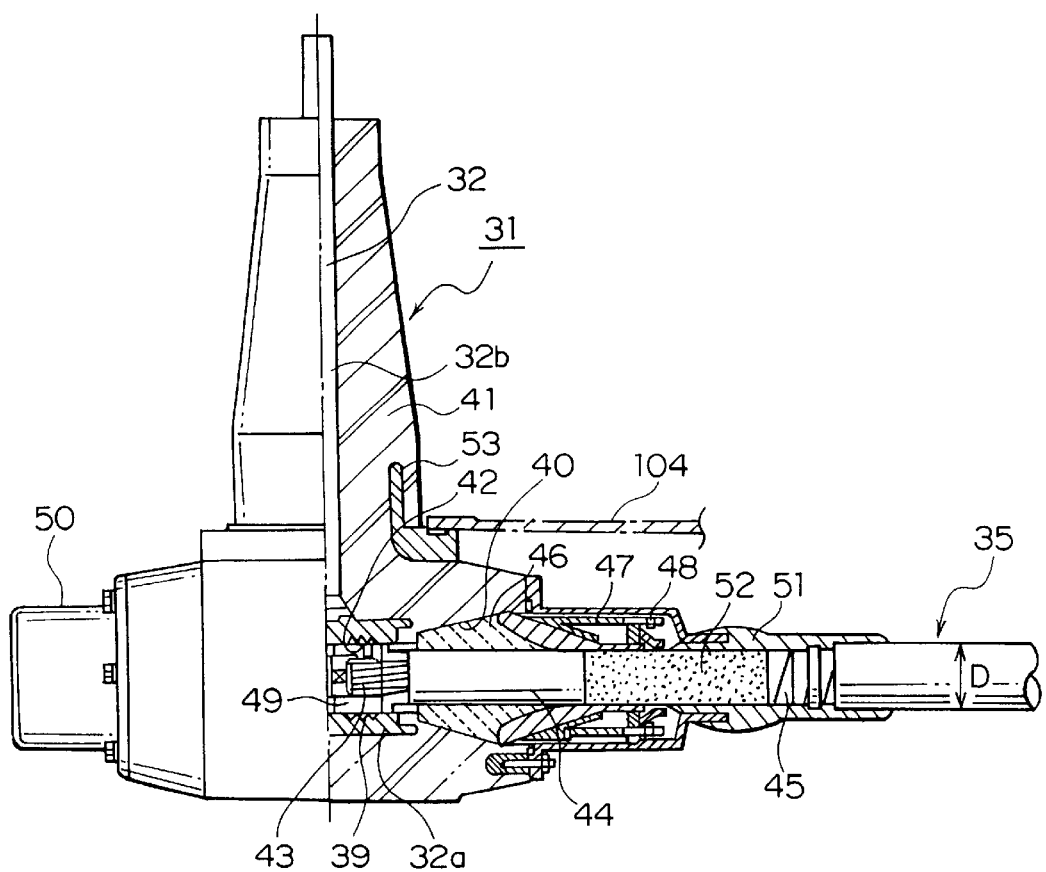
FIG. 4 is a configuration diagram showing an example of a conventional T-shaped bushing.

FIG. 1 is a block diagram showing a first embodiment in accordance with the present invention, taking an example of inter-switchboard connection between the cubicles 102 and 103 shown in FIG. 3 as a conventional device.

As shown in the diagram, a T-shaped bushing 1 includes a bushing mold 11 formed to have a virtually T shape by a horizontal portion 11a and a vertical portion 11b, and a virtually T-shaped current-carrying conductor 12 integrally molded inside the bushing mold 11 along the T profile. To be more specific, the bushing mold 11 is formed using an insulating resin or the like, such as an epoxy resin, and its general configuration has a virtually T shape that is substantially identical to that of the conventional device. The vertical portions 11b are inserted in the cubicles 102 and 103. Both ends of the horizontal portion 11a have connection ports 13 for connecting a coupling bus 2 to the current-carrying conductor 12. The configurations of the connection ports 13 are formed to have conical shapes, diameters of which increase outwardly.

The current-carrying conductor 12 is constructed by a horizontal conductive portion 12a disposed at a center of the horizontal portion 11a of the bushing mold 11 and a leader conductive portion 12b formed vertically from the center of the horizontal conductive portion 12a. Both sides of the horizontal conductive portion 12a are formed to be cylindrical, and contacts 3 are provided on inner peripheries thereof.

The coupling bus 2 is a solid insulating bus wherein an outer peripheral surface of a central conductor 21 composed of a one-wire conductor is covered with an insulating rubber member 22, with an end of the central conductor 21 being exposed. The insulating rubber member 22 is provided with conical portions 22b formed at both ends thereof to have a conical shape that fits the connection port 13 of the bushing mold 11, so they can be inserted therein and a cylindrical portion 22a composed of a cylindrical body of a predetermined thickness extending between the conical portions 22b at both ends. A boundary portion between the conical portion 22b and the cylindrical portion 22a is formed into a stepped portion so that the diameter of the cylindrical portion 22a is smaller than that of the conical portion 22b.

Furthermore, a conductive layer 4 is provided on a surface where the outer peripheral surface of the central conductor 21 and the inner peripheral surface of the insulating rubber member 22 are in contact. The outer peripheral surface of the cylindrical portion 22a of the insulating rubber member 22 is provided with a conductive layer 5. The conductive layer 5 is configured to permit grounding by an outgoing line or the like.

Both ends of the central conductor 21 are formed into stepped portions having a smaller diameter at their distal ends so that the central conductor 21 is in contact with the contacts 3 at the stepped portions.

To connect the switchboards by the T-shaped bushing 1 and the coupling bus 2, both ends of the coupling bus 2 are first inserted into the connection ports 13 of the T-shaped bushings 1, then fixtures 6 are pressed against the stepped portions of the insulating rubber members 22, and the stepped portions are pushed into the connection ports 13 by screws 7 screwed into the end surfaces of the connection ports 13. This causes the ends of the central conductor 21 of the coupling bus 2 to be in contact with the contacts 3 and the conical portions 22b of the insulating rubber members 22 to be in close contact with the bore inner surfaces of the connection ports 13. The conductive layers 5 of the insulating rubber members 22 are also grounded.

The first embodiment configured as described above provides the following advantages.

The conductive layers 5 are formed on the outer peripheral surfaces of the cylindrical portions 22a of the insulating rubber members 22, and the conductive layers 5 are grounded, so that safety in case the coupling bus 2 should be touched can be enhanced. Moreover, the arrangement permits a simpler construction that obviates the need for stripping the coupling bus 2, and makes it possible to also simplify the structure of the portion to be inserted into the T-shaped bushing 1. This leads to a reduction in fabrication cost of the bus coupling device for connecting enclosed switchboards with an insulating gas sealed therein, and also to a reduction in time required for coupling work with a consequent reduced cost for the coupling work.

Furthermore, in the first embodiment, the outer peripheral surface of the central conductor 21 is covered with the insulating rubber member 22, and the conical portion 22b of the insulating rubber member 22 is pressed against the inner peripheral surface of the connection port 13 of the T-shaped bushing 1. Hence, even if the T-shaped bushing 1 is dislocated, the insulating rubber member 22 readily deforms so as to maintain constant surface pressure of the portion where the insulating rubber member 22 and the central conductor 21 are in contact, so that insulation performance can be maintained virtually unchanged.

The coupling bus 2 can be fabricated with high dimensional accuracy at factories as a cable dedicated for coupling the switchboards or cubicles 101, 102, 103, and 104. Thus, the time and efforts for making dimensional adjustments in the coupling work at a site can be further reduced.

Also, as The coupling bus 2 has the conductive layer 4 provided on the surface where the outer peripheral surface of the central conductor 21 and the inner peripheral surface of the insulating rubber member 22 are in contact, the conductive layer 4 allows the central conductor 21 and the insulating rubber member 22 to be at least partly in electrical contact. This makes it possible to restrain variations in electric field distribution attributable to variations in a parting distance between the central conductor 21 and the insulating rubber member 22.

Second Embodiment

In a second embodiment, an air unit is connected to one of the connection ports 13 of a T-shaped bushing 1.

Figure 2:
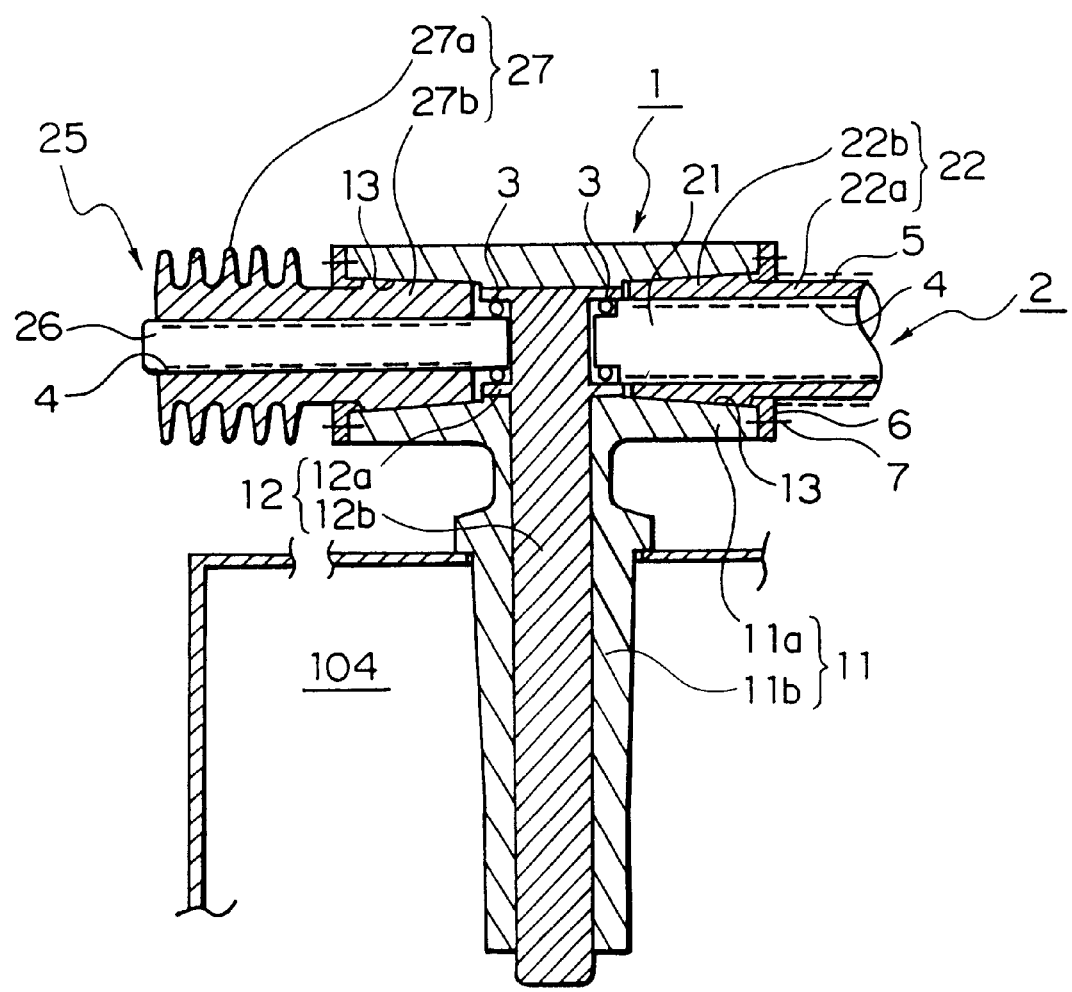
FIG. 2 is a block diagram showing a second embodiment in accordance with the present invention.

More specifically, in the conventional device shown in FIG. 3, the T-shaped bushing 31 attached to the cubicle 104 has the blank cap 50 connected to one of the connection ports. In this second embodiment, the air unit is connected in place of the blank cap 50. FIG. 2 shows a specific construction.

Referring to FIG. 2, the T-shaped bushing 1, the coupling bus 2, and the insertion connection portions of the second embodiment share exactly the same construction as those of the first embodiment. The second embodiment differs from the first embodiment in that a bushing 25 for connecting an air unit is provided at one of the connection ports 13. In FIG. 2, components that are the same as those of the first embodiment and the conventional device are assigned the same reference numerals, and the descriptions thereof will not be repeated.

In the bushing 25 for connecting an air unit shown in FIG. 2, an outer peripheral surface of a central conductor 26 is covered with an insulating rubber member 27, and an end of the central conductor 26 is exposed, as in the case of the coupling bus 2. An end to be inserted into the T-shaped bushing 1 is formed as a conical portion 27b having the same shape as that of the conical portion 22b of the coupling bus 2. The conical portion 27b shares the same connecting structure as that of the conical portion 22b of the coupling bus 2. A plurality of ribs 27a that have a larger outside diameter than an outside diameter of the conical portion 27b are provided on an outer side of a connection port 13 in the insulating rubber member 27. An air unit, such as a transformer, is connected to the central conductor 26 exposed from the bushing 25 for connecting an air unit.

In the second embodiment configured as described above, the ribs 27a allow a larger insulation distance to be provided between an air unit and a bushing mold 11. With this arrangement, safe connection in air to another unit can be easily accomplished.

In another embodiment, although not shown, one of the connection ports 13 of the T-shaped bushing 1 may have the same structure as that in the conventional device, and the power receiving cable 105 shown in FIG. 3 may be connected to the connection port 13.

Thus, in order to fulfill the aforesaid object, the device for bus coupling between enclosed switchboards with an insulating gas sealed therein in accordance with the present invention includes: a coupling bus for establishing communication between switchboards that have an insulating gas sealed therein and which accommodate electric units; a T-shaped bushing that has a current-carrying conductor integrally molded therein, a connection port for the coupling bus, and a contact for making connection between the coupling bus and the current-carrying conductor; and a fixture for securing an end of the coupling bus that has been inserted in the connection port of the T-shaped bushing, wherein a bore shape of the connection port for the coupling bus in the T-shaped bushing is a conical shape in which the diameter thereof increases outwardly, the coupling bus has a central conductor composed of a one-wire conductor, an insulating rubber member covering an outer peripheral surface of the central conductor, and a conductive layer formed on the outer peripheral surface of the insulating rubber member, in which both end portions of the insulating rubber member are formed into conical portions that fit to the connection port, a portion between both end portions is formed into a cylindrical portion having a uniform diameter, and a boundary portion between the cylindrical portion and the conical portions is formed into a stepped portion so that the outside diameter of the cylindrical portion is smaller than the outside diameters of the conical portions, the fixture secures the coupling bus by pressing the stepped portion into the connection port, and the conductive layer is provided only on an outer peripheral surface of the cylindrical portion, and further, is grounded. This arrangement allows an extremely simple structure and permits dislocation during installation or machining errors to be absorbed, making it possible to achieve a shortened time for installation, reduced cost, and improved quality of work.

Moreover, according to the device for bus coupling between enclosed switchboards with an insulating gas sealed therein in accordance with the present invention, the coupling bus further has a conductive layer between an inner surface of the insulating rubber member and the outer peripheral surface of the central conductor. This arrangement allows the central conductor and the insulating rubber member to be at least partly in electrical contact, making it possible to restrain variations in electric field distribution attributable to variations in a parting distance between the central conductor and the insulating rubber member.

In addition, according to the device for bus coupling between enclosed switchboards with an insulating gas sealed therein in accordance with the present invention, an air unit coupling bushing is provided at one of the connection ports of the bushing mold. The air unit coupling bushing is equipped with a central conductor and an insulating rubber member covering the central conductor. One end of the insulating rubber member is formed into a conical portion that fits to the connection port, and an outer peripheral surface on an outer side of the connection port in the insulating rubber member is provided with ribs that have an outside diameter larger than the outside diameter of the conical portion. With this arrangement, a larger insulation distance can be allowed between an air unit and the bushing mold, so that safe connection in air with another unit can be easily accomplished.

What is claimed is:

1. A device for bus coupling between enclosed switchboards with an insulating gas sealed therein, comprising:

a coupling bus between enclosed switchboards with an insulating gas sealed therein;

a T-shaped bushing that has a current-carrying conductor integrally molded therein, a connection port for the coupling bus, and a contact for making connection between the coupling bus and the current-carrying conductor; and a fixture for securing an end of the coupling bus that has been inserted in the connection port of the T-shaped bushing, wherein a bore shape of the connection port for the coupling bus in the T-shaped bushing is a conical shape in which the diameter thereof increases outwardly, the coupling bus has a central conductor composed of a one-wire conductor, an insulating rubber member covering an outer peripheral surface of the central conductor, and a conductive layer formed on the outer peripheral surface of the insulating rubber member, in which both end portions of the insulating rubber member are formed into conical portions that fit to the connection port, a portion between both end portions is formed into a cylindrical portion having a uniform outside diameter, and a boundary portion between the cylindrical portion and the conical portions is formed into a stepped portion so that the outside diameter of the cylindrical portion is smaller than the outside diameter of the conical portions, the fixture secures the coupling bus by pressing the stepped portion into the connection port, and the conductive layer is provided only on an outer peripheral surface of the cylindrical portion, and further, is grounded.

2. A device for bus coupling between enclosed switchboards with an insulating gas sealed therein according to claim 1, wherein the coupling bus has a conductive layer between an inner surface of the insulating rubber member and the outer peripheral surface of the central conductor.

3. A device for bus coupling between enclosed switchboards with an insulating gas sealed therein according to claim 1, wherein the coupling bus has an air unit coupling bushing provided at one of the connection ports of the T-shaped bushing, in which the air unit coupling bushing comprises a central conductor and an insulating rubber member covering the central conductor, one end of the insulating rubber member is formed into a conical portion that fits to the connection port, and an outer peripheral surface on an outer side of the connection port in the insulating rubber member is provided with ribs that have an outside diameter larger than the outside diameter of the conical portion.

* * * * *